(12) United States Patent
Haynes et al.

(10) Patent No.: US 11,485,502 B2
(45) Date of Patent: Nov. 1, 2022

(54) GIRT BOARDING AID FOR EVACUATION SLIDE

(71) Applicant: GOODRICH CORPORATION, Charlotte, NC (US)

(72) Inventors: Timothy C. Haynes, Prescott Valley, AZ (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 600 days.

(21) Appl. No.: 16/544,361

(22) Filed: Aug. 19, 2019

(65) Prior Publication Data
US 2021/0053693 A1  Feb. 25, 2021

(51) Int. Cl.
*B64D 25/18* (2006.01)
*B64D 25/14* (2006.01)
*B63C 9/04* (2006.01)

(52) U.S. Cl.
CPC ........... *B64D 25/18* (2013.01); *B63C 9/04* (2013.01); *B64D 25/14* (2013.01); *B63C 2009/042* (2013.01)

(58) Field of Classification Search
CPC .......... B64D 25/14; B64D 25/18; B63C 9/04; B63C 2009/042
See application file for complete search history.

(56) References Cited

U.S. PATENT DOCUMENTS

| | | | | |
|---|---|---|---|---|
| 3,833,088 | A * | 9/1974 | Chacko | B64D 25/14 193/25 B |
| 4,989,691 | A | 2/1991 | Wilkerson | |
| 5,301,630 | A * | 4/1994 | Genovese | B63B 27/14 244/905 |
| 5,360,186 | A * | 11/1994 | Danielson | B64D 25/14 193/25 B |
| 5,906,340 | A * | 5/1999 | Duggal | B64D 25/14 193/25 B |
| 6,959,658 | B2 * | 11/2005 | Gronlund | B64D 25/14 112/475.08 |
| 2018/0334256 | A1 | 11/2018 | Haynes et al. | |
| 2019/0233173 | A1 * | 8/2019 | Haynes | B63C 9/04 |
| 2019/0316416 | A1 * | 10/2019 | Haynes | B64D 25/14 |

FOREIGN PATENT DOCUMENTS

CN  208294124  12/2018

* cited by examiner

*Primary Examiner* — Tye William Abell
(74) *Attorney, Agent, or Firm* — Snell & Wilmer L.L.P.

(57) ABSTRACT

An evacuation slide for an aircraft may be deployable in a slide mode and a raft mode. The evacuation slide includes a head end and a toe end, with the head end having a mounting feature and the toe end being longitudinally opposite the head end. In response to the evacuation slide being in the slide mode, the head end of the evacuation slide is mounted to the aircraft via the mounting feature. In response to the evacuation slide being in the raft mode, the evacuation slide is detached from the aircraft and the mounting feature is a boarding aid, according to various embodiments.

18 Claims, 6 Drawing Sheets

GIRT BOARDING AID FOR EVACUATION SLIDE

FIELD

The present disclosure relates to aircraft evacuation assemblies, and more specifically to boarding aids for evacuation slides in raft mode.

BACKGROUND

In the event of an emergency landing, aircraft typically have one or more evacuation assemblies, such as inflatable evacuation slides, that can be deployed to facilitate safe evacuation of passengers and crew. If the emergency landing is a water landing, evacuation slides can be used as life rafts to hold evacuated passengers. Conventional life rafts often include a strap or rope ladder that passengers can climb in order to board the evacuation slide in raft mode. However, conventional strap/rope ladders can be difficult to use because traditional strap/rope ladders deform in response to a passenger's weight, making it difficult for the passenger to locate the next rung of the strap/rope ladder.

SUMMARY

According to various embodiments, the present disclosure provides an evacuation slide for an aircraft, the evacuation slide deployable in a slide mode and a raft mode. The evacuation slide may include a head end and a toe end. The head end may include a mounting feature and the toe end may be longitudinally opposite the head end such that a longitudinal axis of the evacuation slide extends from the head end to the toe end. In response to the evacuation slide being in the slide mode the head end of the evacuation slide is mounted to the aircraft via the mounting feature, according to various embodiments. In response to the evacuation slide being in the raft mode the evacuation slide is detached from the aircraft and the mounting feature is a boarding aid, according to various embodiments.

In various embodiments, the mounting feature comprises a ply configured to be coupled to a girt sleeve affixed to the aircraft in the slide mode. The ply may be configured to be coupled to the girt sleeve via a daisy chain assembly. In response to the evacuation slide being in the raft mode, the ply may be configured to hang down to facilitate passenger boarding. In various embodiments, the ply comprises a passenger foot hold. In various embodiments, the passenger foot hold is one foot hold of a plurality of foot holds, wherein the plurality of foot holds is a plurality of apertures defined in the ply.

In various embodiments, the ply is a lower ply, the mounting feature further comprises an upper ply configured to be coupled to the girt sleeve of the aircraft in the slide mode, and the upper ply has a passenger hand hold. In response to the evacuation slide being in the slide mode, the passenger hand hold is covered by the upper ply such that the passenger hand hold is inaccessible to passengers, according to various embodiments. In response to the evacuation slide being in the raft mode, the passenger hand hold is uncovered such that the passenger hand hold is accessible to passengers, according to various embodiments. In various embodiments, the upper ply comprises a fastener configured to retain the upper ply in an uncovered position to reveal the passenger hand hold in the raft mode.

Also disclosed herein, according to various embodiments, is an aircraft that includes an evacuation slide deployable in a slide mode and a raft mode, with the evacuation slide comprising a mounting feature. The aircraft also includes a girt sleeve affixed to a frame of the aircraft. In response to the evacuation slide being in the slide mode, the mounting feature of the evacuation slide is coupled to the girt sleeve, according to various embodiments. In in response to the evacuation slide being in the raft mode, the evacuation slide is detached from the aircraft and the mounting feature is a boarding aid, according to various embodiments.

Also disclosed herein, according to various embodiments, is a method of deploying an evacuation slide for an aircraft. The method may include inflating an evacuation slide, wherein the evacuation slide comprises a mounting feature coupled with a girt sleeve affixed to a frame of the aircraft. The method may also include, after inflating the evacuation slide, detaching the evacuation slide form the aircraft by uncoupling the mounting feature from the girt sleeve, wherein after detaching the evacuation slide from the aircraft the mounting feature can be used as a boarding aid.

In various embodiments, the mounting feature comprises a lower ply such that detaching the evacuation slide from the aircraft comprises releasing a daisy chain assembly to allow the lower ply to drop down to facilitate passenger boarding. In various embodiments, the method further includes folding an upper ply of the mounting feature to uncover a hand hold.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
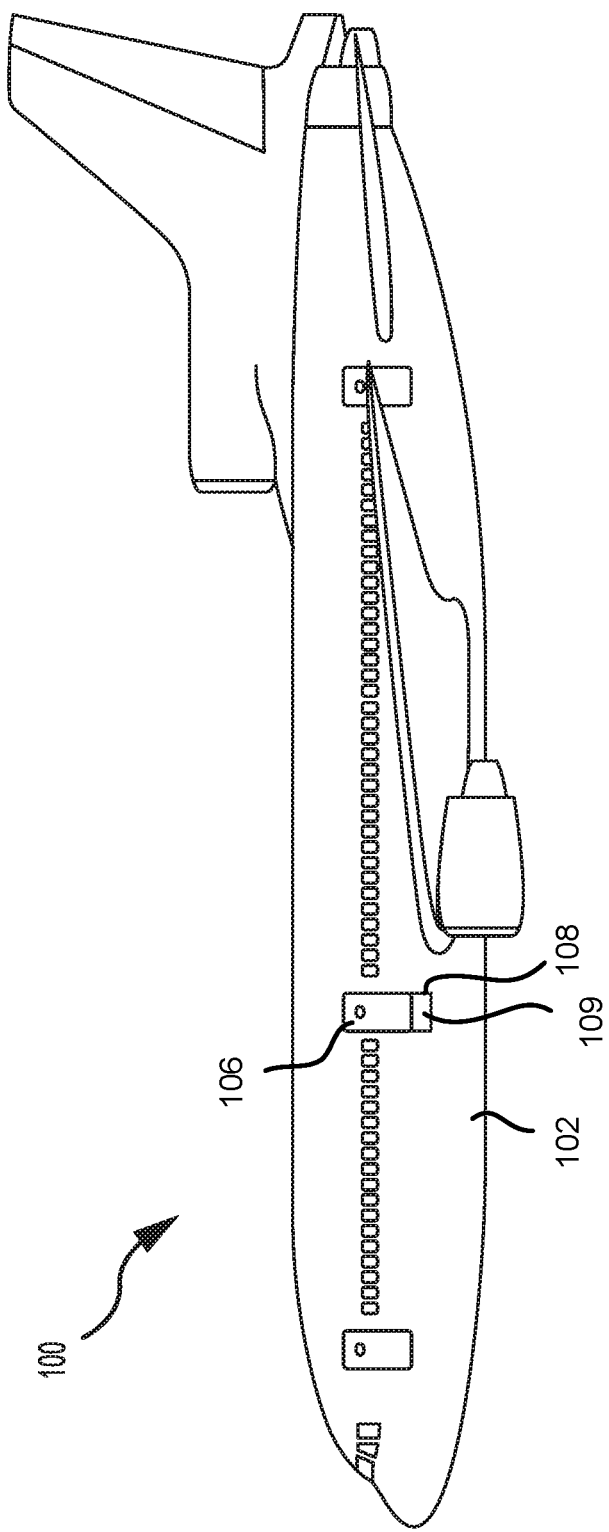
FIG. 1 illustrates a perspective view of an aircraft having an evacuation assembly, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration.

While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

Referring to FIG. 1, an exemplary aircraft 100 is shown, in accordance with various embodiments. Aircraft 100 may comprise a fuselage 102 with wings fixed to fuselage 102. An evacuation assembly, such as an evacuation slide 200 (FIG. 2), may be deployable from the aircraft, such as from a position below main emergency exit door 106. Blowout panel 109 may cover evacuation assembly in a pre-deployed state on the aircraft 100. In various embodiments, the evacuation assembly may include and/or be housed within a packboard 108 mounted to the aircraft 100.

The evacuation assembly may jettison the blowout panel 109 and deploy an evacuation slide 200 (FIG. 2), such as an inflatable evacuation slide, in response to emergency exit door 106 opening or in response to another evacuation event. In various embodiments, and with reference to FIG. 2, in the event of an emergency water landing, evacuation slide 200 can also be used as a passenger raft. That is, the evacuation slide 200 can be utilized in both a slide mode and a raft mode. However, as mentioned above, it is often difficult for passengers trying to board (from the water) the evacuation slide in the raft mode to use conventional boarding aid, such as a strap/rope ladder 250. Accordingly, the present disclosure generally relates to a mounting feature 210 of an evacuation slide 200 that has dual functionality based on whether the evacuation slide is in the slide mode or the raft mode. That is, in response to the evacuation slide 200 being in the slide mode the mounting feature 210 is configured to function as an interface for mounting the evacuation slide 200 to the aircraft, and in response to the evacuation slide 200 being in the raft mode the mounting feature 210 is configured to function as a boarding aid to facilitate passenger boarding, according to various embodiments.

Figure 2:
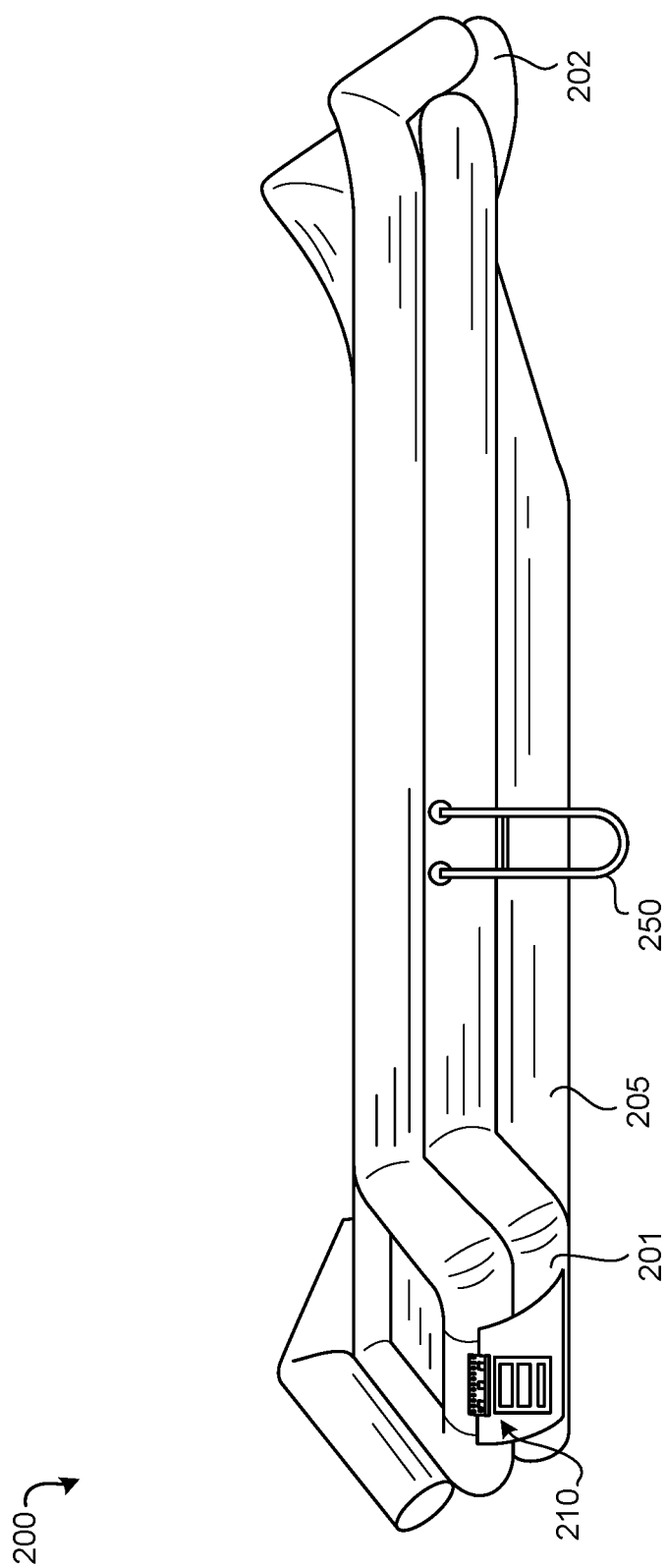
FIG. 2 is a schematic perspective view of an evacuation slide in raft mode with a mounting feature useable as a boarding aid, in accordance with various embodiments.

In various embodiments, and with continued reference to FIG. 2, the evacuation slide 200 includes a head end 201 and a toe end 202. The body of the evacuation slide 200 extending between and forming the head end 201 and the toe end 202 may include one or more inflatable tubes 205. For example, the evacuation slide 200 may include one or more border tubes that provide structure to the evacuation slide 200 in slide mode and provide buoyancy to the evacuation slide 200 in raft mode. The inflatable border tubes may extend along opposing lateral sides of a sliding surface defined between the border tubes. In various embodiments, the evacuation includes two layers of tubes, mounted one above the other, to provide a degree of buoyancy redundancy.

The head end 201 of the evacuation slide may comprise the mounting feature 210, with the toe end 202 being disposed longitudinally opposite the head end 201 such that a longitudinal axis of the evacuation slide extends from the head end 201 to the toe end 202. In response to the evacuation slide being in the slide mode, the head end 201 the evacuation slide 200 is mounted to the aircraft via the mounting feature 210. After passengers have been evacuated from the aircraft, the evacuation slide 200 may be disconnected from the aircraft and the mounting feature 210 of the evacuation slide 200 then functions as a boarding aid, according to various embodiments. The mounting feature 210 may hang down toward the water, thus allowing a passenger to grasp the mounting feature to board the evacuation slide 200 in raft mode. The mounting feature 210 may include one or more passenger foot holds and/or passenger hand holds, as described below.

Figure 3A:
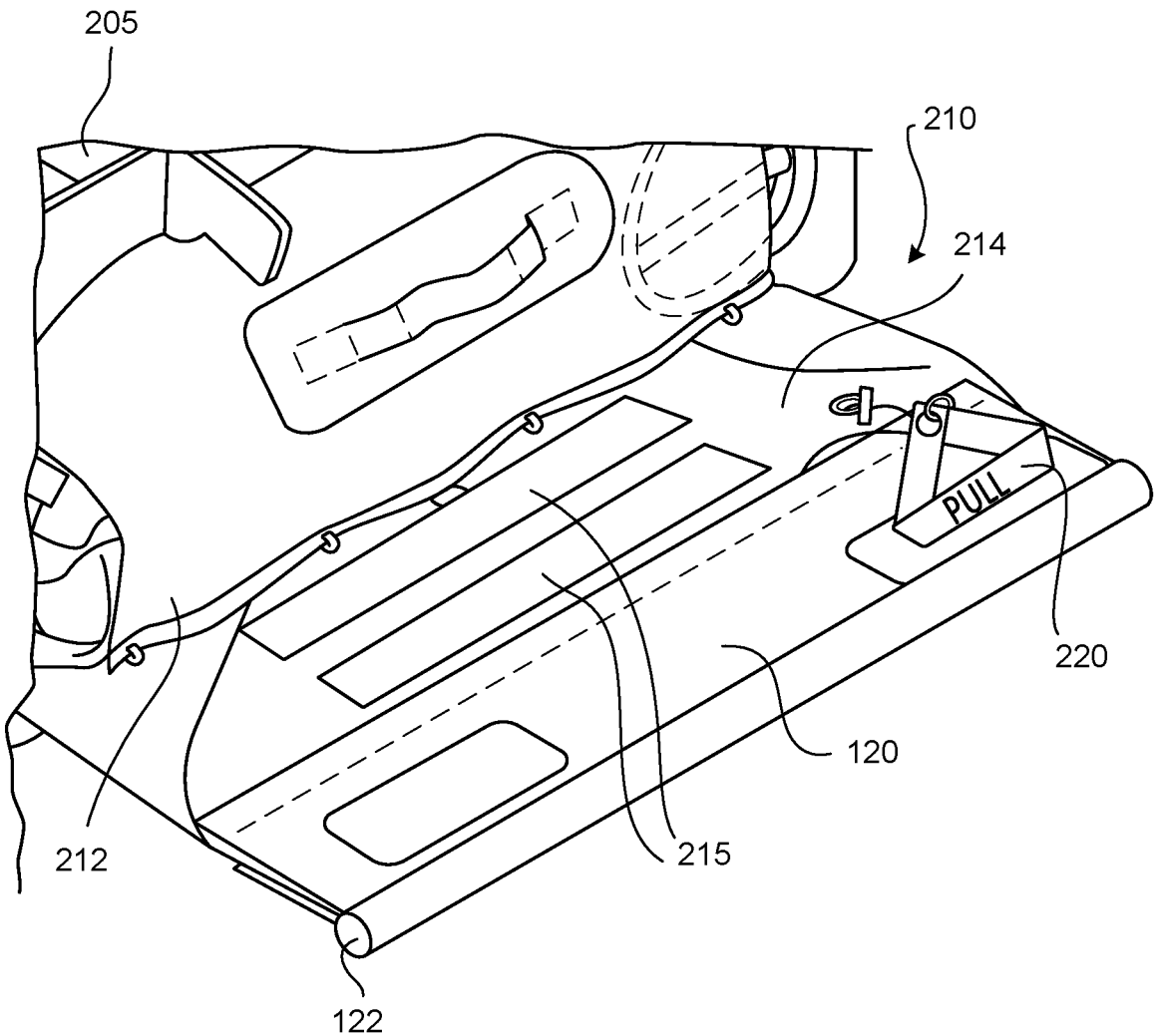
FIG. 3A is a perspective view of an upper ply and a lower ply of a mounting feature of an evacuation slide coupled to a girt sleeve of an aircraft, in accordance with various embodiments.
Figure 3B:
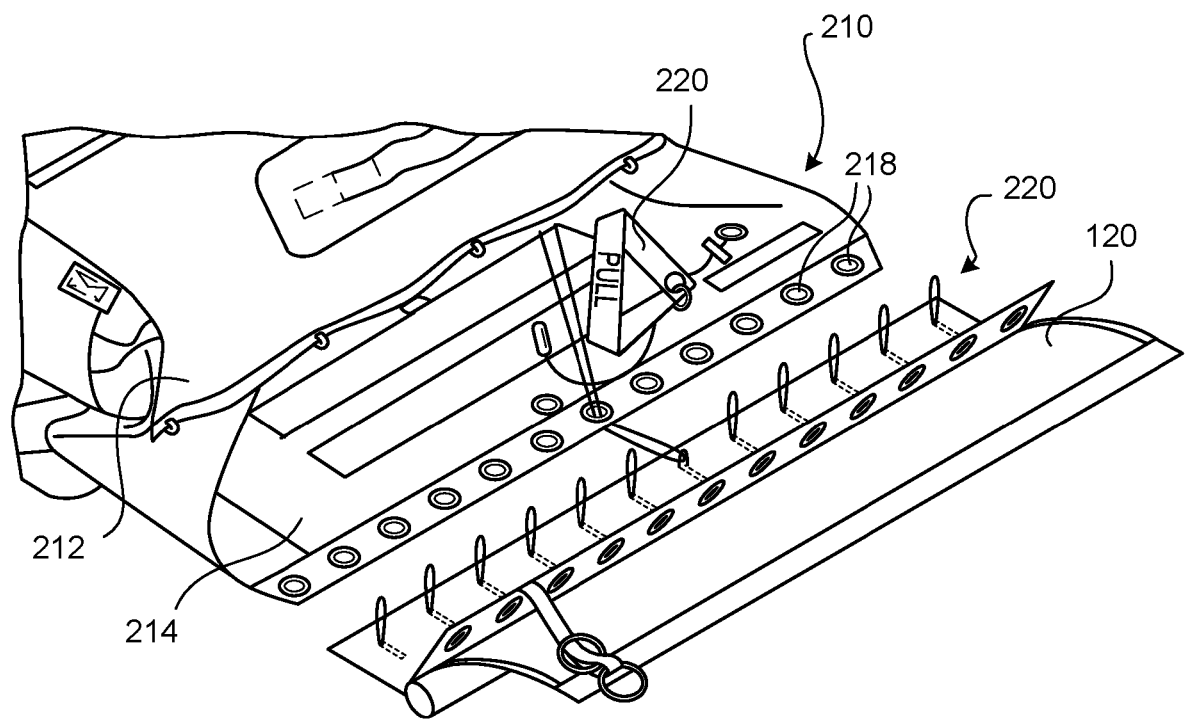
FIG. 3B is a perspective view of an upper ply and a lower ply of a mounting feature of an evacuation slide uncoupled from a girt sleeve of an aircraft, in accordance with various embodiments.
Figure 4:
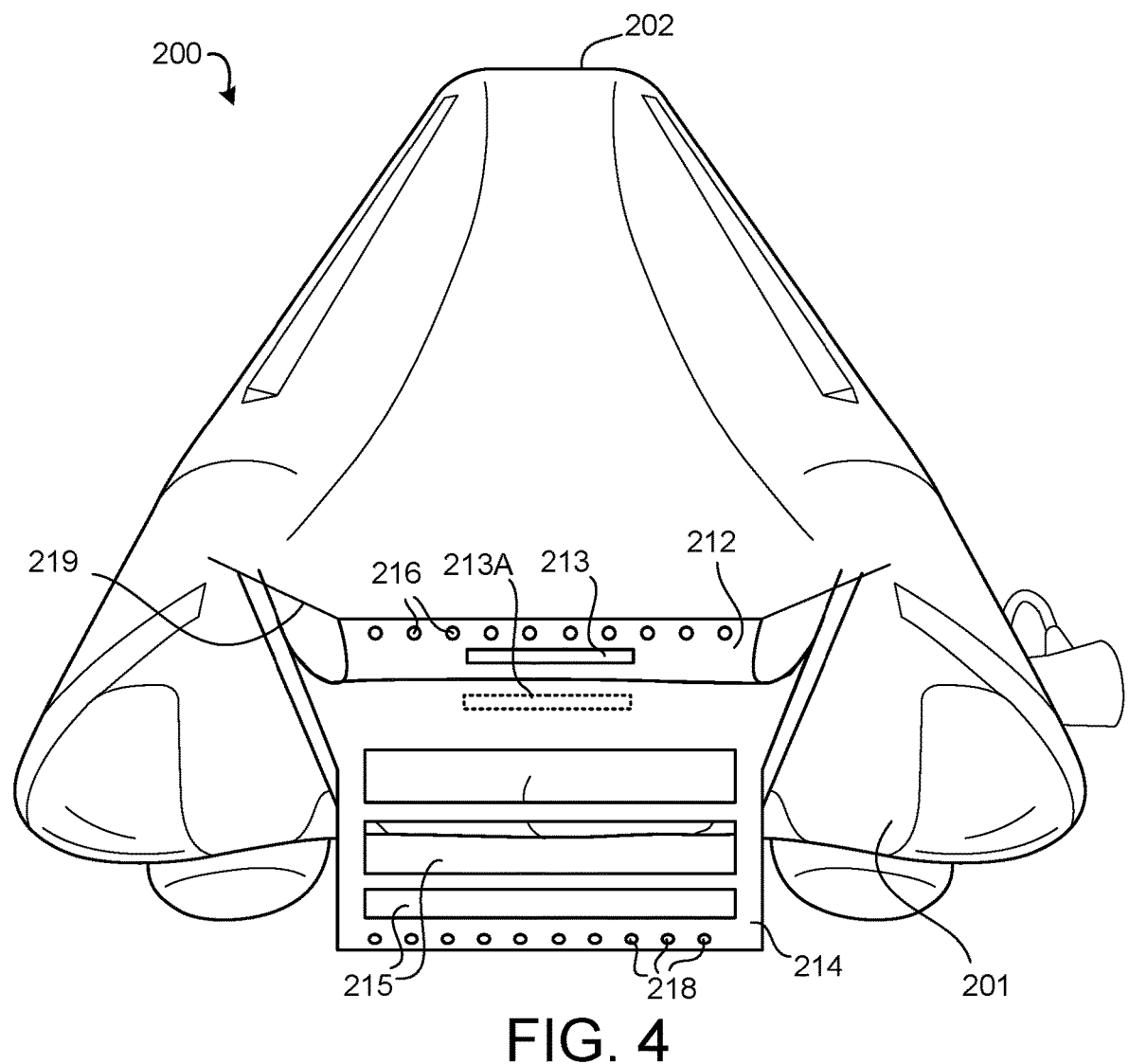
FIG. 4 is a perspective view of a lower ply of a mounting feature of an evacuation slide hanging down to facilitate passenger boarding into the evacuation slide in raft mode, in accordance with various embodiments.

In various embodiments, and with reference to FIGS. 3A, 3B, and 4, the mounting feature 210 includes one or more plies 212, 214 of material, often referred to collectively as a girt, that are coupled to a girt sleeve 120 affixed to a frame of the aircraft in slide mode. The girt sleeve 120 may include a support bar 122 (or may define a pocket into which a support bar may be inserted) that is configured to be affixed to the aircraft. The support bar 122 of the girt sleeve 120 may be configured to be the primary, load bearing connection point between the aircraft and the evacuation slide 200 in slide mode. Extending from the support bar 122 of the girt sleeve 120 may be one or more panels of material that are mated with the one or more plies of material of the mounting feature 210. For example, the mounting feature 210 (e.g., girt) may have an upper ply 212 and a lower ply 214. The plies 212, 214 may be coupled to the girt sleeve 120. For example, a daisy chain assembly 220 may be utilized to reversibly affix the mounting feature 210 to the aircraft via the girt sleeve 120. The daisy chain assembly 220 may include a tether interlaced with grommets 216, 218 (FIGS. 3B and 4) on the plies 212, 214 of the mounting feature 210 and the girt sleeve 120. The daisy chain assembly 220 may also include a release pin that, in response to being translated by a user (e.g., a passenger), causes the lacing of the daisy chain to release, thereby enabling the evacuation slide 200 to be detached from the aircraft and transitioned to the raft mode.

In various embodiments, the lower ply 214 of the mounting feature 210 comprises one or more passenger foot holds 215. Accordingly, in response to the evacuation slide 200 being in the raft mode, the lower ply 214 may hang down toward a bottom side of the evacuation slide (i.e., in a direction toward the water when the evacuation slide is floating in water in the raft mode), thus allowing a passenger to grasp the lower ply 214 and begin to climb the lower ply 214, using the one or more passenger foot holds 215, to board the evacuation slide 200 in raft mode. The one or more passenger foot holds 215 may be one or more apertures defined in the material of the lower ply 214, may be loops or other features coupled to the lower ply 214, or may be otherwise formed on or integrated with the lower ply 214. In various embodiments, the one or more foot holds 215 may be inaccessible by passengers with the evacuation slide 200 in slide mode, and thus may be configured to only be accessible in response to the evacuation slide 200 being in the raft mode (i.e., disconnected from the aircraft).

In various embodiments, the upper ply 212 of the mounting feature 210 comprises one or more passenger hand holds 213. The one or more passenger hand holds 213 may be one or more apertures defined in the material of the upper ply 212, may be loops or other features coupled to the upper ply 212, or may be otherwise formed on or integrated with the upper ply 212. The one or more hand holds 213, 213A may enable a passenger to grasp the upper ply 212 and climb into the raft. In various embodiments, the upper ply 212 may fold upwards (i.e., in a direction toward a top side of the evacuation slide 200) in the raft mode to reveal and/or uncover the one or more passenger hand holds 213A. That is, the one or more hand holds 213A may be covered by the upper ply 212 and may thus be inaccessible to passengers with the evacuation slide 200 in the slide mode, but may be uncovered and thus accessible with the evacuation slide 200 in the raft mode. In various embodiments, the evacuation slide 200 includes a fastener 219 (FIG. 4) configured to retain the upper ply 212 in an uncovered (i.e., folded upwards) position, thereby revealing one or more passenger hand holds 213A.

Figure 5:
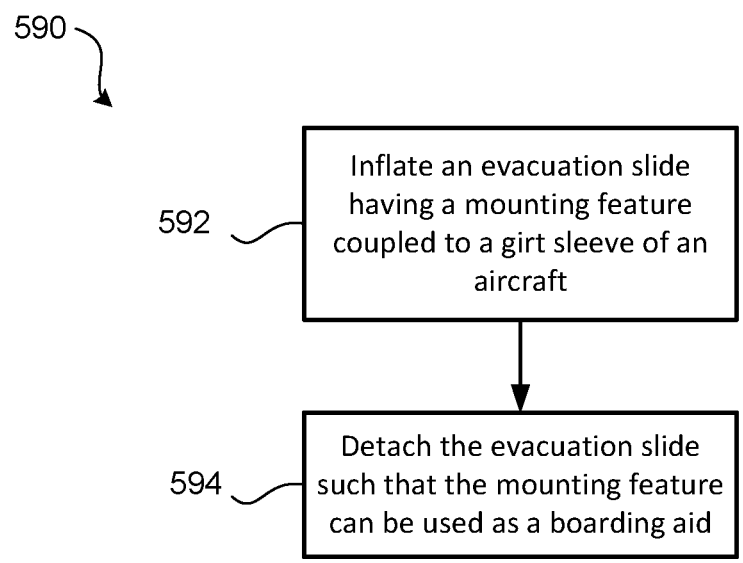
FIG. 5 is a schematic flow chart diagram of a method of deploying an evacuation slide, in accordance with various embodiments.

In various embodiments, and with reference to FIG. 5, a method 590 of deploying an evacuation slide for an aircraft is provided. The method 590 may include inflating an evacuation slide having a mounting feature coupled to a girt sleeve of an aircraft at step 592. The method 590 may further include detaching the evacuation slide such that the mounting feature can be used as a boarding aid at step 594. In various embodiments, step 594 includes uncoupling the mounting feature from the girt sleeve In various embodiments, the mounting feature comprises a lower ply such that step 594 includes releasing a daisy chain assembly to allow the lower ply to drop down to facilitate passenger boarding. In various embodiments, the method 590 further includes folding an upper ply of the mounting feature to uncover a hand hold.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide for an aircraft, the evacuation slide deployable in a slide mode and a raft mode, the evacuation slide comprising:
   a head end comprising a mounting feature; and
   a toe end longitudinally opposite the head end such that a longitudinal axis of the evacuation slide extends from the head end to the toe end;
   wherein, in response to the evacuation slide being in the slide mode, the head end of the evacuation slide is mounted to the aircraft via the mounting feature;
   wherein, in response to the evacuation slide being in the raft mode, the evacuation slide is detached from the aircraft and the mounting feature is a boarding aid;
   wherein the boarding aid comprises a first aperture in a ply of the mounting feature;
   wherein the ply is configured to be coupled to a girt sleeve affixed to the aircraft in the slide mode; and
   wherein the first aperture is configured to form a passenger foot hold.

2. The evacuation slide of claim 1, wherein the ply is configured to be coupled to the girt sleeve via a daisy chain assembly.

3. The evacuation slide of claim 1, wherein in response to the evacuation slide being in the raft mode the ply is configured to hang down to facilitate passenger boarding.

4. The evacuation slide of claim 1, wherein the passenger foot hold is one foot hold of a plurality of foot holds.

5. The evacuation slide of claim 1, wherein:
   the ply is a lower ply;
   the mounting feature further comprises an upper ply configured to be coupled to the girt sleeve of the aircraft in the slide mode; and the upper ply comprises, in a first portion, a second aperture configured to form a passenger hand hold.

6. The evacuation slide of claim 5, wherein:

in response to the evacuation slide being in the slide mode the passenger hand hold is covered by a second portion of the upper ply such that the passenger hand hold in the first portion is inaccessible to passengers; and in response to the evacuation slide being in the raft mode the second portion of the upper ply is folded such that the passenger hand hold is accessible to passengers.

7. The evacuation slide of claim 6, wherein the upper ply comprises a fastener configured to retain the second portion of the upper ply to reveal the passenger hand hold in the raft mode.

8. An aircraft comprising:

an evacuation slide deployable in a slide mode and a raft mode, the evacuation slide comprising a mounting feature; and a girt sleeve affixed to a frame of the aircraft;

wherein, in response to the evacuation slide being in the slide mode, the mounting feature of the evacuation slide is coupled to the girt sleeve;

wherein, in response to the evacuation slide being in the raft mode, the evacuation slide is detached from the aircraft and the mounting feature is a boarding aid;

wherein the boarding aid comprises a first aperture in a ply of the mounting feature;

wherein the first aperture is configured to form a passenger foot hold.

9. The aircraft of claim 8, wherein the passenger foot hold is one foot hold of a plurality of foot holds.

10. The aircraft of claim 8, wherein in the slide mode the girt sleeve is coupled to the mounting feature via a daisy chain assembly.

11. The aircraft of claim 10, wherein the mounting feature comprises an upper ply and a lower ply that are both coupled to the girt sleeve via the daisy chain assembly.

12. The aircraft of claim 11, wherein in response to the evacuation slide being in the raft mode the lower ply is configured to hang down to facilitate passenger boarding.

13. The aircraft of claim 12, wherein the lower ply comprises the first aperture.

14. The aircraft of claim 12, wherein the upper ply comprises, in a first portion, a second aperture configured to form a passenger hand hold.

15. The aircraft of claim 14, wherein:

in response to the evacuation slide being in the slide mode, the passenger hand hold is covered by a second portion of the upper ply such that the passenger hand hold in the first portion is inaccessible to passengers; and in response to the evacuation slide being in the raft mode, the second portion of the upper ply is folded such that the passenger hand hold is accessible to passengers.

16. A method of deploying an evacuation slide for an aircraft, the method comprising:

inflating an evacuation slide, wherein the evacuation slide comprises a mounting feature coupled with a girt sleeve affixed to a frame of the aircraft; and after inflating the evacuation slide, detaching the evacuation slide from the aircraft by uncoupling the mounting feature from the girt sleeve, wherein after detaching the evacuation slide from the aircraft the mounting feature can be used as a boarding aid, wherein the boarding aid comprises a first aperture in a ply of the mounting feature, and wherein the first aperture is configured to form a passenger foot hold.

17. The method of claim 16, wherein the mounting feature comprises a lower ply such that detaching the evacuation slide from the aircraft comprises releasing a daisy chain assembly to allow the lower ply to drop down to facilitate passenger boarding.

18. The method of claim 17, further comprising folding a second portion of an upper ply of the mounting feature to uncover a second aperture configured to form a hand hold in a first portion of the upper ply.

\* \* \* \* \*